United States Patent
Kishore et al.

(10) Patent No.: US 12,449,296 B2
(45) Date of Patent: Oct. 21, 2025

(54) METHODS, APPARATUSES, AND COMPUTER PROGRAM PRODUCTS FOR MEASURING FLUID VOLUMES

(71) Applicant: HONEYWELL INTERNATIONAL INC., Charlotte, NC (US)

(72) Inventors: Kuna Venkat Satya Rama Kishore, Charlotte, NC (US); Vijayakumar S, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 300 days.

(21) Appl. No.: 18/342,895

(22) Filed: Jun. 28, 2023

(65) Prior Publication Data

US 2024/0019287 A1 Jan. 18, 2024

(30) Foreign Application Priority Data

Jul. 13, 2022 (IN) .............................. 202211040178

(51) Int. Cl.
*G01F 22/02* (2006.01)
*A61B 5/02* (2006.01)
*G08B 21/18* (2006.01)

(52) U.S. Cl.
CPC .......... *G01F 22/02* (2013.01); *A61B 5/02042* (2013.01); *G08B 21/182* (2013.01)

(58) Field of Classification Search
CPC ..... G01F 22/02; G01F 22/00; A61B 5/02042; G08B 21/182; A61M 1/60; A61M 1/777; A61M 2205/18; A61M 2205/3348; A61M 2205/52
See application file for complete search history.

(56) References Cited

U.S. PATENT DOCUMENTS

| | | | |
|---|---|---|---|
| 4,562,842 A | 1/1986 | Morfeld et al. | |
| 5,522,805 A * | 6/1996 | Vancaillie | A61M 1/777 604/246 |
| 6,884,341 B2 * | 4/2005 | Ferguson | G01N 1/2813 137/550 |

(Continued)

FOREIGN PATENT DOCUMENTS

| WO | 96/40323 A1 | 12/1996 |
|---|---|---|
| WO | 2017/066783 A1 | 4/2017 |

OTHER PUBLICATIONS

Hang C. Ha et al., "Estimation of blood loss in the operating room," Canadian Anaesthetists' Society Journal, 33:685, (Sep. 1986). [Retrieved from the Internet Dec. 27, 2023: URL: <https://link.springer.com/content/pdf/10.1007/BF03014281.pdf>].

*Primary Examiner* — Tarun Sinha
(74) *Attorney, Agent, or Firm* — Alston & Bird LLP

(57) ABSTRACT

Example methods, apparatuses, and computer program products for measuring fluid volumes are provided. An example fluid volume measuring assembly includes a first perforated tube, a total fluid volume measuring device, and a non-blood fluid volume measuring device. In some examples, the total fluid volume measuring device includes a membrane sack positioned in the first perforated tube and a first pressure sensor positioned in the membrane sack. In some examples, the non-blood fluid volume measuring device includes a second perforated tube covered by a filter paper and positioned in the first perforated tube and a second pressure sensor positioned in the second perforated tube.

20 Claims, 6 Drawing Sheets

(56) References Cited

U.S. PATENT DOCUMENTS

| | | |
|---|---|---|
| 7,469,727 B2 | 12/2008 | Marshall |
| 8,628,671 B2 | 1/2014 | Eagle et al. |
| 2019/0125941 A1 | 5/2019 | Li et al. |
| 2021/0330196 A1 | 10/2021 | Lentz et al. |

\* cited by examiner

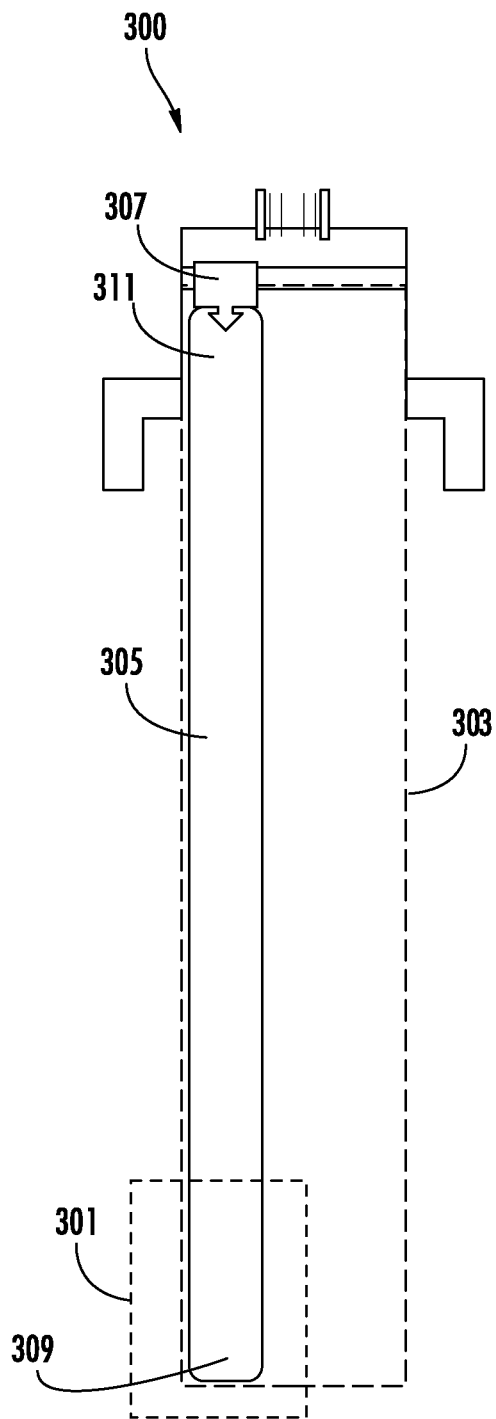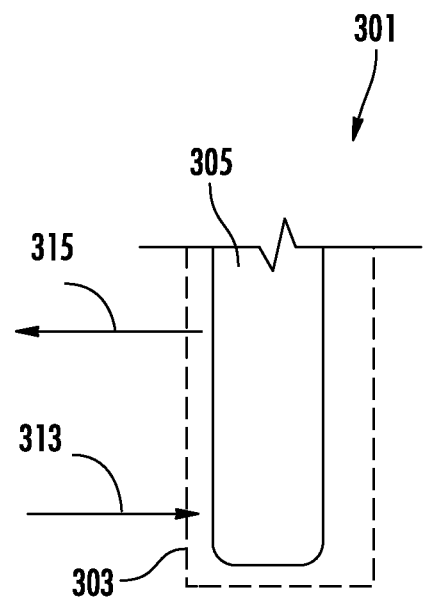
FIG. 3A
FIG. 3B

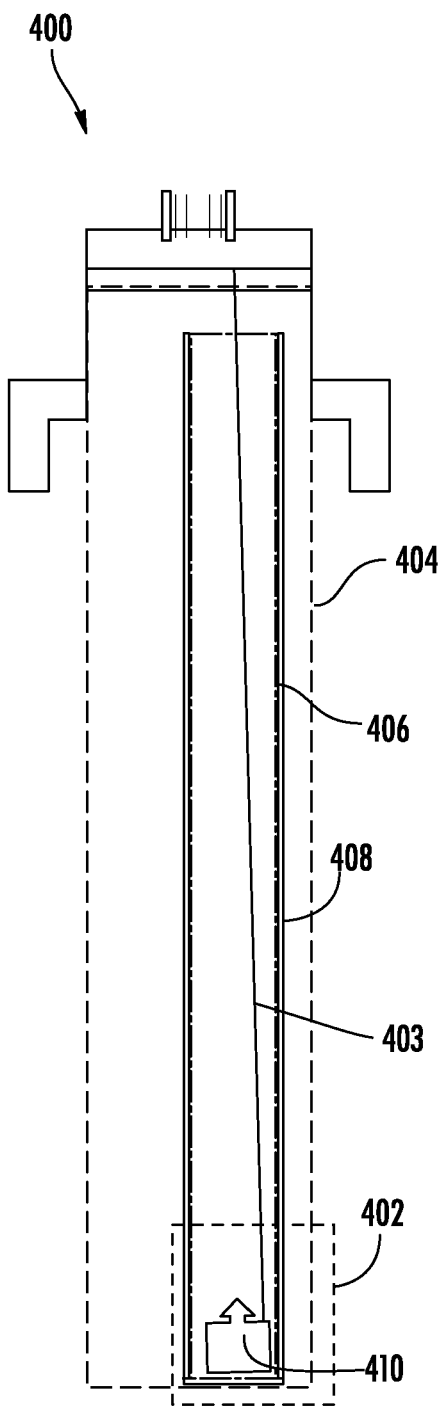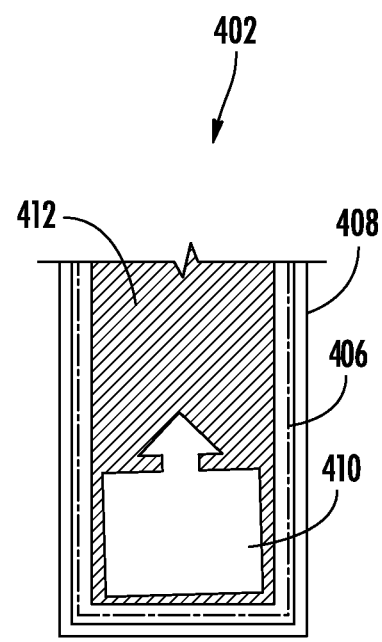
FIG. 4A
FIG. 4B

METHODS, APPARATUSES, AND COMPUTER PROGRAM PRODUCTS FOR MEASURING FLUID VOLUMES

CROSS-REFERENCE TO RELATED APPLICATIONS

Example This application claims priority pursuant to 35 U.S.C. 119(a) to Indian Application No. 202211040178, filed Jul. 13, 2022, which application is incorporated herein by reference in its entirety.

FIELD OF THE INVENTION

Example embodiments of the present disclosure relate generally to measuring fluid volumes. For example, example embodiments of the present disclosure provide example methods, apparatuses, systems, computer programming products for measuring fluid volumes in an example suction canister (including, but not limited to, measuring the total fluid volume in the example suction canister, the non-blood fluid volume in the example suction canister, and the blood fluid volume in the example suction canister).

BACKGROUND

In many surgeries and surgical procedures, blood loss is inevitable for many patients. However, an excessive amount of blood loss and/or a rapid rate/pace of blood loss can be lethal to those patients.

Applicant has identified many technical challenges and difficulties associated with measuring fluid volumes, especially associated with measuring the volume of blood loss during surgery operations.

BRIEF SUMMARY

Various embodiments described herein provide example methods, apparatuses, systems, computer programming products for measuring fluid volumes.

In accordance with some embodiments of the present disclosure, an example fluid volume measuring assembly is provided. In some embodiments, the example fluid volume measuring assembly comprises a first perforated tube, a total fluid volume measuring device, and a non-blood fluid volume measuring device.

In some embodiments, the total fluid volume measuring device comprises a membrane sack positioned in the first perforated tube and a first pressure sensor positioned at least partially in the membrane sack. In some embodiments, the non-blood fluid volume measuring device comprises a second perforated tube covered by a filter paper and positioned in the first perforated tube and a second pressure sensor positioned in the second perforated tube.

In some embodiments, the first perforated tube comprises a bottom end portion and a top end portion. In some embodiments, the bottom end portion is opposite to the top end portion.

In some embodiments, the bottom end portion of the first perforated tube is in contact with a bottom surface of a suction canister.

In some embodiments, the top end portion of the first perforated tube is positioned through a spout opening of a suction canister.

In some embodiments, a buffer solution is disposed in the membrane sack.

In some embodiments, the buffer solution comprises at least one of deionized water or a saline solution.

In some embodiments, the membrane sack comprises a bottom end portion and a top end portion. In some embodiments, the bottom end portion is opposite to the top end portion.

In some embodiments, the bottom end portion of the membrane sack is sealed and attached to the bottom end portion of the first perforated tube.

In some embodiments, the first pressure sensor is positioned at the top end portion of the membrane sack.

In some embodiments, the filter paper comprises a porous surface. In some embodiments, a pore size associated with the porous surface is 0.1 to 0.5 micrometers.

In some embodiments, the second perforated tube comprises a bottom end portion and a top end portion. In some embodiments, the bottom end portion is opposite to the top end portion.

In some embodiments, a portion of the filter paper that covers the bottom end portion of the second perforated tube is in contact with the bottom end portion of the first perforated tube.

In some embodiments, the second pressure sensor is positioned at the bottom end portion of the second perforated tube.

In some embodiments, the fluid volume measuring assembly comprises an electrical connector. In some embodiments, the first pressure sensor and the second pressure sensor are connected to the electrical connector through a plurality of electrical wires.

In some embodiments, the fluid volume measuring assembly comprises an electronic device connected to the electrical connector. In some embodiments, the electronic device comprises a processor, a memory storing a program code, a display, and an alarm circuitry.

In some embodiments, the memory and the program code are configured to, with the processor, cause the electronic device to: retrieve an estimated blood loss threshold value and a fast loss warning threshold value; generate an average estimated blood loss variable and an average fast loss warning variable associated with a sample time period; and determine whether the average estimated blood loss variable satisfies the estimated blood loss threshold value and whether the average fast loss warning variable satisfies the fast loss warning threshold value.

In some embodiments, when generating the average estimated blood loss variable, the memory and the program code are configured to, with the processor, cause the electronic device to: generate a plurality of estimated blood loss variables associated with a plurality of sample time points over the sample time period.

In some embodiments, the memory and the program code are configured to, with the processor, cause the electronic device to: receive a first pressure measurement signal from the first pressure sensor and a second pressure measurement signal from the second pressure sensor. In some embodiments, the first pressure measurement signal and the second pressure measurement signal are associated with a sample time point of the plurality of sample time points. In some embodiments, the memory and the program code are configured to, with the processor, cause the electronic device to: generate a blood loss volume estimate variable associated with the sample time point based at least in part on the first pressure measurement signal and the second pressure measurement signal.

In some embodiments, the memory and the program code are configured to, with the processor, cause the electronic device to: in response to determining that the average estimated blood loss variable satisfies the estimated blood loss threshold value, trigger an estimated blood loss alarm.

In some embodiments, the memory and the program code are configured to, with the processor, cause the electronic device to: in response to determining that the average fast loss warning variable satisfies the fast loss warning threshold value, trigger a fast loss warning alarm.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 3A and FIG. 3B illustrate example views associated with an example total fluid volume measuring device of an example fluid volume measuring assembly in accordance with some embodiments of the present disclosure;

FIG. 4A and FIG. 4B illustrate example views associated with an example non-blood fluid volume measuring device of an example fluid volume measuring assembly in accordance with some embodiments of the present disclosure;

DETAILED DESCRIPTION OF THE INVENTION

Figure 1:
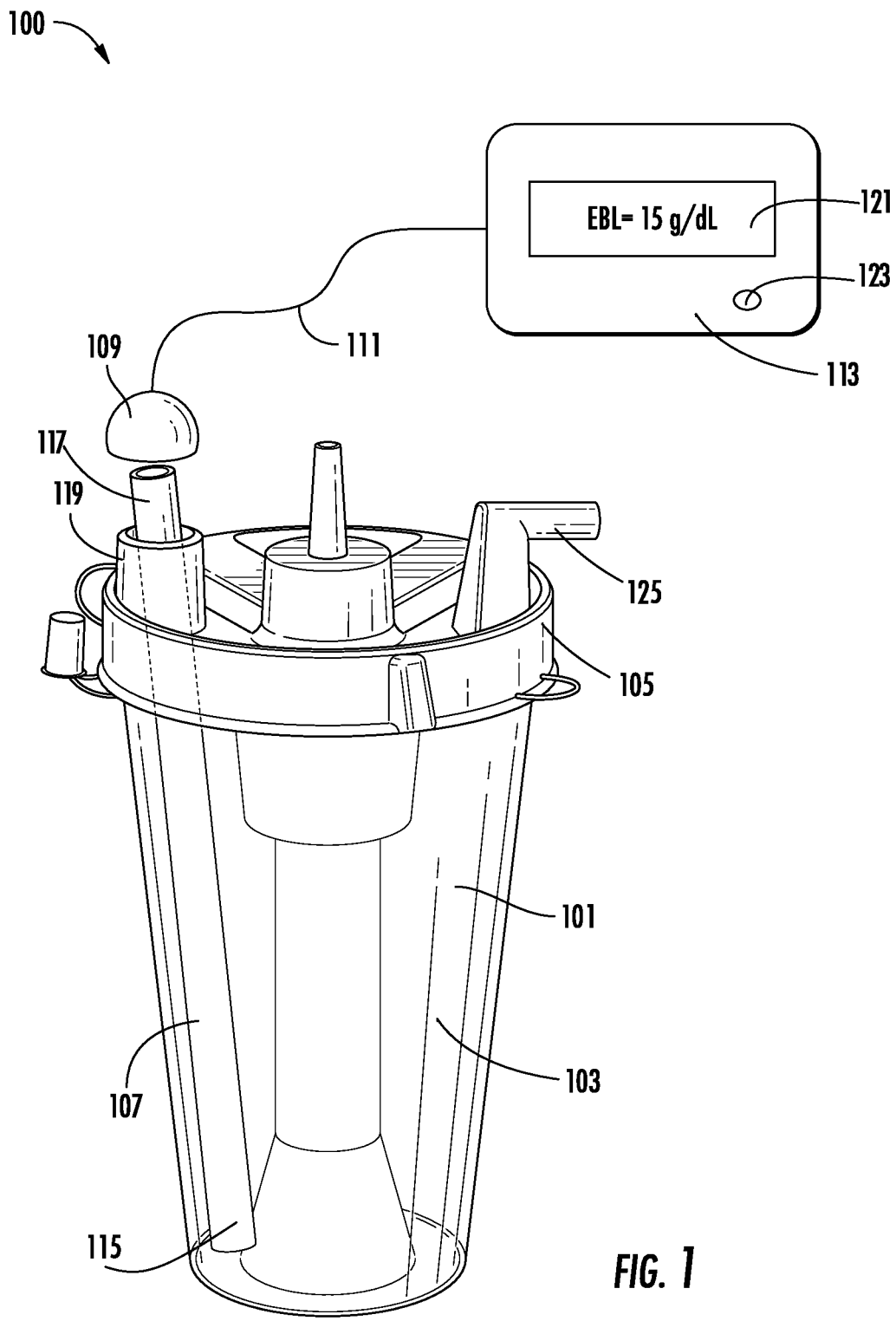
FIG. 1 illustrates an example view of an example fluid volume measuring environment in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, voltage/current, data and/or information may be transmitted to and/or received from these elements or components.

As described above, blood loss is inevitable for many patients during surgeries and/or surgical procedures. However, an excessive amount of blood loss and/or a rapid rate of blood loss can be lethal to those patients. As such, surgeons and/or operating room nurses should always be on alert in monitoring total blood loss during surgeries and/or surgical procedures.

It is important to estimate the volume of total blood loss, as the volume of total blood loss can have an influence on many decisions during surgeries and/or surgical procedures, such as, but not limited to, the decision on the volume of replacing fluids to be injected to the patients through one or more intravenous lines (IVs), and/or the decision on whether to start transfusion of blood in extreme cases where the blood loss is excessive and/or at a rapid rate/pace.

However, inaccurate estimates on total blood loss volumes can cause the patients to receive an improper amount of fluids during surgeries and/or surgical procedures, which can lead to unpredictable dilution of blood. Additionally, inaccurate estimates on total blood loss volumes can also cause under-transfusion of blood products or over-transfusion of blood products to the patients, resulting in serious consequences such as, but not limited to, medical conditions such as shortness of breath. As such, there is a need to accurately estimate the volume of total blood loss during surgeries and/or surgical procedures in real time, which can provide lifesaving benefits to patients.

In many surgeries and/or surgical procedures, one or more suction canisters are used as one or more temporary storage containers for collecting fluid from a patient's body (referring to as "suction fluid"). For example, the suction fluid may comprise blood that is lost from the surgeries and/or surgical procedures, along with other fluids such as, but not limited to, irrigation fluid (e.g. saline), bodily tissues and/or other non-blood components (such as, but not limited to, ascites, bile, gastric fluid, mucus, pleural fluid and/or urine). When a surgery or surgical procedural is in progress (for example, in an operation theater (OT)/operation room (OR)), the circulatory nurse needs to assess the actual blood loss from the fluid mix that is being collected into suction canister and/or collected into other moping aids such as surgery sponges, clothes, gauzes, and/or the like that have been used to soak and/or clean the fluids from patient's body. In a quick pace situation (such as, but not limited to, in OT/OR), it is important for the circulatory nurse to take appropriate actions (such as, but not limited to, alert surgeons and/or other responsible personnel) so as to make decisions on whether to start infusion of required fluids (including, but not limited to, blood replacement) to the patient. In addition, it is mandatory to document, as part of the surgery report, total blood loss and replacement (if any) for administrative, insurance and/or any other suitable purposes.

However, there are many technical challenges and difficulties associated with measuring/estimating volumes of fluid from patients during surgeries and/or surgical procedures, especially in assessing the actual blood loss both as a part of intraoperative/post procedure assessment and in real time during the surgeries and/or surgical procedures.

In particular, assessing the actual blood loss in real time during surgeries and/or surgical procedures is preferred over assessing the actual blood loss as a part of intraoperative procedure assessment and as a part of post procedure assessment. However, many methods of assessing actual blood loss in real time during surgeries and/or surgical procedures require using surgery sponges, clothes, gauzes, and/or the like to soak up fluids from the patient's body (including blood) and manually weighting surgery sponges, clothes, gauzes, and/or the like to infer the weight and the volume of the blood. Such methods provide inaccurate estimates of the volume of blood loss. Further, because such methods require the circulatory nurse to manually weighting surgery sponges, clothes, gauzes, and/or the like, such methods limit the circulatory nurse's ability and capacity to perform other duties for the surgeries and/or surgical procedures, which can cause negative impacts on the surgeries and/or surgical procedures (especially in the quick pace of OT/OR).

Some methods provide automated/semi-automated systems to assess blood loss, such as by utilizing the suction pad on the OT table with a suction canister and a vacuum pump. However, such automated/semi-automated systems require sophisticated solutions in assessing blood loss. For example, some methods of monitoring blood loss in real time are based on (i) measuring the blood hemoglobin using optical/spectrometry methods, (ii) capturing images of the suction canister to estimate the level and/or volume of fluid, and/or to estimate the blood hemoglobin level from pixel color intensities in the images by leveraging machine learning and/or statistical techniques (for example, by a remote server that is hosted in cloud) and (iii) one or more smart phone applications that perform image processing on images of surgery sponges, clothes, gauzes, and/or the like to derive the weight/volume/level sensing information. However, such methods are also plagued by many technical challenges and difficulties. For example, many operation theaters/operation rooms may not provide sufficient lighting for capturing images of suction canister and/or surgery sponges, clothes, gauzes, and/or the like. As a result, these images may not capture all the necessary details in the suction canister and/or surgery sponges, clothes, gauzes, and/or the like, causing inaccurate estimates of fluid volumes based on these images. In addition, the automated/semi-automated systems in these methods can be difficult to set up and/or maintain in the OT/OR, which limits the applications of these methods.

Various embodiments of the present discourse overcome these technical challenges and difficulties, and provide various technical advantages and improvements. For example, various embodiments of the present disclosure provide a disposable sensor unit along with an electronic device (referred to collectively as a "fluid volume measuring assembly" herein) that can assess the volume of total blood loss during surgeries and/or surgical procedures, even if the blood is mixed with other surgical fluids. Various embodiments of the present disclosure provide valuable features such as, but not limited to, determining a critical warnings of fast/quick blood loss events to help nurses/doctors make quick decisions, measuring both blood loss and other fluids by eliminating manual interventions, and meeting hospital requirements in maintaining such records with accurate volume estimates.

In addition, all of suction system items that come in contact with the fluids (such as, but not limited to, suction canister, liners, pads and any measuring sensors/devices of the fluid volume measuring assembly) are disposable after surgery. As such, various embodiments of the present disclosure provide a fluid volume measuring assembly that not only has the ability to extract actual blood loss from total suction fluids, but also utilizes low cost, disposable devices (compared to expensive and complex optical systems or other techniques), therefore providing economical and valuable solutions for measuring fluid volumes including, but not limited to, the total fluid volume, the non-blood fluid volume, and the blood fluid volume.

Referring now to FIG. 1, an example view of an example fluid volume measuring environment 100 in accordance with some example embodiments is provided. In the example shown in FIG. 1, the example fluid volume measuring environment 100 comprises an example suction canister 101 and an example fluid volume measuring assembly.

In some embodiments, the example suction canister 101 comprises a suction body 103 and a suction cover 105. In some embodiments, the suction body 103 is sealed to the suction cover 105 so that the suction canister 101 is airtight.

Similar to those described above, the example suction canister 101 shown in FIG. 1 provides a temporary storage container that collects suction fluid from a patient. For example, the example suction canister 101 comprises a vacuum inlet 125 that is positioned on the suction cover 105. In some embodiments, the vacuum inlet 125 is connected to a suction device (for example, but not limited to, a suction pump) via a suction tube. In some embodiments, the suction device provides suction fluids to the example suction canister 101 through the suction tube and via the vacuum inlet 125.

In the example shown in FIG. 1, the example fluid volume measuring assembly comprises a first perforated tube 107, a connector plug 109, a connector cable 111, and an electronic device 113.

In some embodiments, at least a portion of the first perforated tube 107 is positioned within the suction body 103 of the example suction canister 101, and is in contact with the suction fluid in the example suction canister 101.

For example, the first perforated tube 107 comprises a bottom end portion 115 and a top end portion 117. In the example shown in FIG. 1, the bottom end portion 115 of the first perforated tube 107 is opposite to the top end portion 117 of the first perforated tube 107. In some embodiments, the bottom end portion 115 of the first perforated tube 107 is in contact with a bottom surface of the suction body 103 of the example suction canister 101. In some embodiments, the suction cover 105 of the example suction canister 101 defines a spout opening 119, and the top end portion 117 of the first perforated tube 107 is positioned through the spout opening 119 of the suction canister 101 and extends outside of the suction canister 101.

In some embodiments, a total fluid volume measuring device and a non-blood fluid volume measuring device are positioned within the first perforated tube 107. In some embodiments, the total fluid volume measuring device measures the volume of the whole suction fluid within the example suction canister 101, and the non-blood fluid volume measuring device measures the volume of the non-blood fluid within the example suction canister 101. For example, the total fluid volume measuring device generates a pressure measurement signal that indicates the whole suction fluid volume, and the non-blood fluid volume measuring device generates a pressure measurement signal that indicates the non-blood fluid volume. In some embodiments, pressure measurement signals generated by the total fluid volume measuring device and the non-blood fluid volume measuring device are non-transitory.

In some embodiments, the volume of actual blood loss can be derived by subtracting the non-blood fluid volume (measured by the non-blood fluid volume measuring device) from the whole suction fluid volume (measured by the total fluid volume measuring device). For example, the total fluid volume measuring device and the non-blood fluid volume measuring device provide pressure measurement signals to the connector plug 109 through electrical wires. As shown in FIG. 1, the connector plug 109 is connected to the connector cable 111, which is in turn connected to the electronic device 113. In some embodiments, the electronic device 113 calculates the volume of blood loss based on the pressure measurement signals from the total fluid volume measuring device and the non-blood fluid volume measuring device, and displays the blood loss volume information on a display 121 of the electronic device 113. As an example, the display 121 of the electronic device 113 may indicate that the volume of blood loss is 15 g/dL as shown in FIG. 1. In some embodiments, the electronic device 113 indicates the volume of blood loss in real time. As such, users of the fluid volume measuring assembly (such as, but not limited to, the circulatory nurse and/or the physician) can obtain blood loss volume information from the display 121 in real time, and can make decisions on whether to start infusion of required fluids (including blood replacement) to the patient.

In some embodiments, the electronic device 113 comprises an alarm 123. For example, the electronic device 113 triggers the alarm 123 (for example, cause an LED of the alarm 123 to flash red light and/or cause a speaker of the alarm 123 to output a warning sound) when the volume of blood loss exceeds a threshold value (e.g. an estimated blood loss alarm as described herein), and/or when the rate of blood loss exceeds a threshold value (e.g. a fast loss warning alarm as described herein). In such examples, users of the fluid volume measuring assembly (such as, but not limited to, circulatory nurses and/or physicians) can be alerted when the blood loss condition of the patient requires attention and action. As such, various embodiments of the present disclosure provide technical benefits and advantages such as, but not limited to, providing accurate estimates of blood loss volumes in real time, as well as alarms on blood loss to alert people to take appropriate actions.

In some embodiments, the first perforated tube 107 (along with the total fluid volume measuring device and the non-blood fluid volume measuring device positioned within the first perforated tube 107) is disposable. For example, a user may connect the first perforated tube 107 to the connector plug 109 and then insert the first perforated tube 107 to the example suction canister 101 to start the measurements of fluid volumes in the example suction canister 101. After the measurements are completed, the user may remove or disconnect the first perforated tube 107 from the connector plug 109 and discard both the first perforated tube 107 and the example suction canister 101. As illustrated in this example, the first perforated tube 107 and the example suction canister 101 are disposed after each use, and the connector plug 109, the connector cable 111, and the electronic device 113 are reusable.

Figure 2:
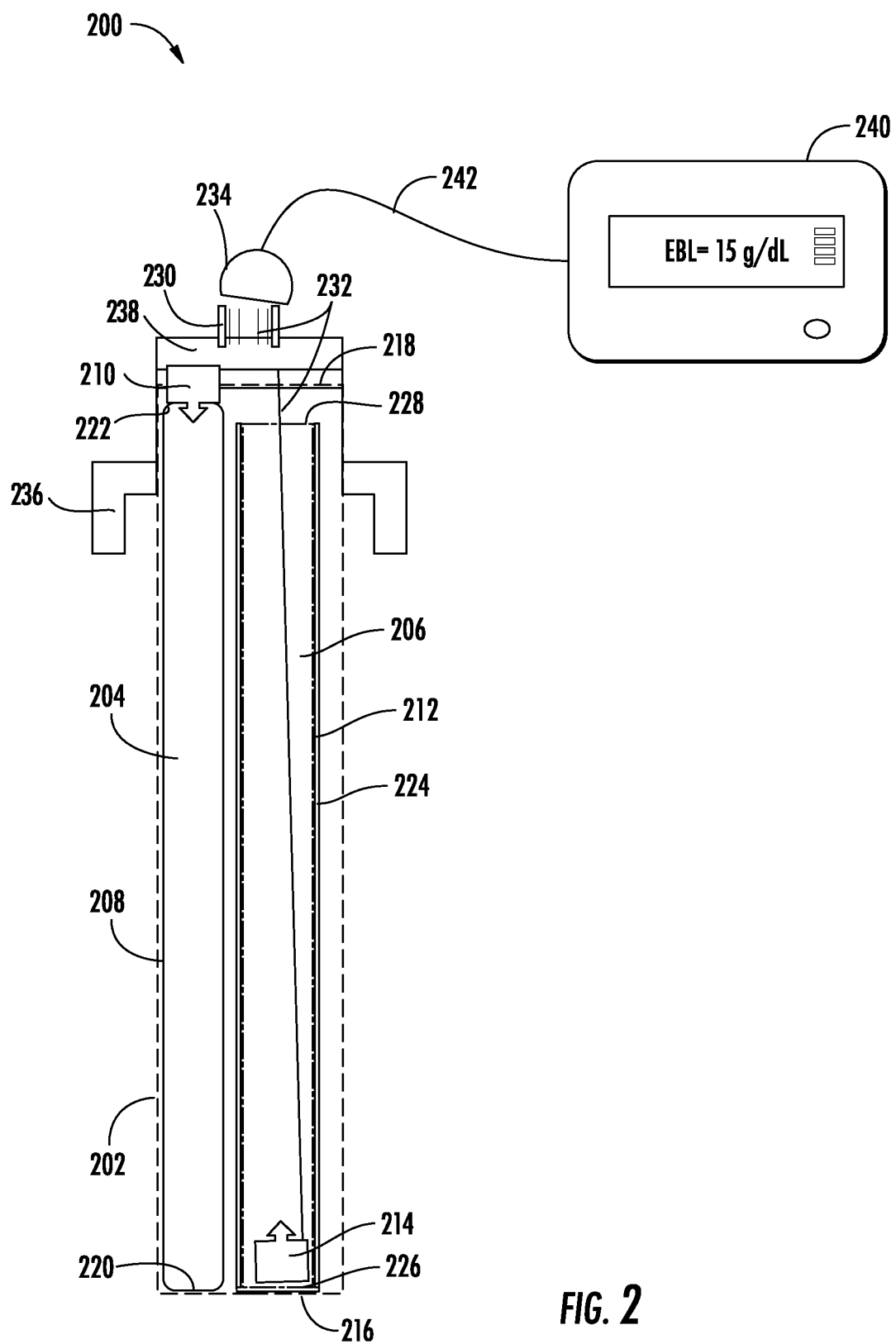
FIG. 2 illustrates an example view of an example fluid volume measuring assembly in accordance with some example embodiments described herein.

Referring now to FIG. 2, an example view of an example fluid volume measuring assembly 200 in accordance with some example embodiments is provided.

In the example shown in FIG. 2, the example fluid volume measuring assembly 200 comprises a first perforated tube 202, a total fluid volume measuring device 204 and a non-blood fluid volume measuring device 206.

In some embodiments, the first perforated tube 202 comprises rigid materials such as, but not limited to, polyethylene terephthalate (PET), polyvinyl chloride (PVC), acrylonitrile butadiene styrene (ABS), and/or the like. In the example shown in FIG. 2, the first perforated tube 202 defines one or more perforations on the tube body that allow the suction fluid in the suction canister to flow through.

In some embodiments, the first perforated tube 202 is in the form of a tube-like device. In some embodiments, the length of the first perforated tube 202 matches a depth of a suction canister (for example, the suction canister that the first perforated tube 202 is or is going to be inserted into as shown in FIG. 1). In some embodiments, the length of the first perforated tube 202 equals or is more than depth of suction canister.

In some embodiments, the first perforated tube 202 comprises a bottom end portion 216 and a top end portion 218. In the example shown in FIG. 2, the bottom end portion 216 is opposite to the top end portion 218.

In some embodiments, the bottom end portion 216 of the first perforated tube 202 is in contact with a bottom surface of a suction canister. For example, the bottom end portion 216 of the first perforated tube 202 sits on the bottom surface of the suction canister, similar to those described and illustrated above in connection with at least FIG. 1.

In some embodiments, the top end portion 218 of the first perforated tube 202 is positioned through a spout opening of a suction canister and extends out of the spout opening of the suction canister, similar to those described and illustrated above in connection with at least FIG. 1. In the example shown in FIG. 2, a cap 236 is attached to a periphery of top end portion 218 of the first perforated tube 202. In some embodiments, the cap 236 is sealed to the first perforated tube 202. In some embodiments, the cap 236 can be put on and/or secured to the spout opening of the suction canister upon inserting the first perforated tube 202 to the suction canister. In some embodiments, the cap 236 provides an airtight seal between the first perforated tube 202 and the spout opening of the suction canister. In other words, the cap 236 allows the suction canister to be sealed airtight after inserting the first perforated tube 202.

In some embodiments, to use the example fluid volume measuring assembly 200 to measure fluid volumes in a suction canister, the first perforated tube 202 is inserted through a spout opening of a top cover of the suction canister and into the inside of suction canister until the first perforated tube 202 touches the inner bottom surface of the suction canister. In some embodiments, the cap 236 is provided as a part of the example fluid volume measuring assembly 200 and secured to the first perforated tube 202 (close to the top end portion 218 of the first perforated tube 202), so that the cap 236 can fit over a spout opening of the suction canister and create a vacuum lock of the suction canister that is airtight, thereby setting the first perforated tube 202 in its position (similar to those described and illustrated above in connection with at least FIG. 1). In some embodiments, after the suction canister is filled with suction fluid, the first perforated tube 202 can be discarded as per the prevailing protocol.

In some embodiments, the example fluid volume measuring assembly 200 comprises two measurement sections that are positioned in a single tube (i.e. the first perforated tube 202). Each section has a different construction to measure hydrostatic pressure of the intended fluid to derive the corresponding volume in cubic centimeters (cc). In the example shown in FIG. 2, the two measurement sections of the example fluid volume measuring assembly 200 include the total fluid volume measuring device 204 and the non-blood fluid volume measuring device 206, which are positioned in the first perforated tube 202.

As such, the example fluid volume measuring assembly 200 provides an unified assembly. In particular, the total fluid volume measuring device 204 and the non-blood fluid volume measuring device 206 are put together in the first perforated tube 202. The first perforated tube 202 is sealed on the bottom end portion 216 (which can be inserted into a suction canister through a spout opening) and terminated at the top end portion 218 such that the first pressure sensor 210 and the electrical connector 230 (details of which are described herein) become parts of the totally unified assembly.

As described above, the example fluid volume measuring assembly 200 defines two measurement sections (also referred to as measurement devices) that are arranged as one disposable package, where one measurement section/device (e.g. the total fluid volume measuring device 204) measures the volume of whole fluid (including suction blood and other fluids) as it is being collected into the suction canister or liner, and the other measurement section/device (e.g. the non-blood fluid volume measuring device 206) separately measures filtered non-blood fluids from the suction canister or liner. As such, accurate measurements/estimates of the volume blood loss can be derived as the difference of volume measurements from two measurement sections/devices.

In the example shown in FIG. 2, the total fluid volume measuring device 204 comprises a membrane sack 208 and a first pressure sensor 210. In some embodiments, the membrane sack 208 and the first pressure sensor 210 are positioned in the first perforated tube 202, and the first pressure sensor 210 is at least partially positioned in the membrane sack 208.

In some embodiments, the membrane sack 208 comprises flexible and waterproof materials. For example, the membrane sack 208 may comprise material(s) such as, but not limited to, polyurethane, polyvinyl chloride, and/or the like. Additionally, or alternatively, the membrane sack 208 may comprise one or more other materials.

In some embodiments, the membrane sack 208 comprises a bottom end portion 220 and a top end portion 222. In the example shown in FIG. 2, the bottom end portion 220 of the membrane sack 208 is opposite to the top end portion 222 of the membrane sack 208.

In some embodiments, the bottom end portion 220 of the membrane sack 208 is sealed and attached to the bottom end portion 216 of the first perforated tube 202. For example, an outer surface of the bottom end portion 220 of the membrane sack 208 is attached to an inner surface of the bottom end portion 216 of the first perforated tube 202. In some embodiments, the bottom end portion 220 of the membrane sack 208 is attached to the bottom end portion 216 of the first perforated tube 202 through, for example but not limited to, chemical glues.

In some embodiments, the membrane sack 208 is sealed. In some embodiments, a buffer solution is disposed inside the membrane sack 208. In some embodiments, the membrane sack 208 is filled with the buffer solution. In some embodiments, there is air at the top end portion 222 of the membrane sack 208. In some embodiments, the buffer solution comprises at least one of deionized water or a saline solution. For example, the deionized water comprises pure, clean water purified by removing atoms, ions, and molecules from tap water through an ion exchange process. The saline solution comprises a mixture of salt and water. Additionally, or alternatively, the buffer solution within the membrane sack 208 comprises other solution(s).

In some embodiments, the first pressure sensor 210 is at least partially positioned in the membrane sack 208. In some embodiments, the first pressure sensor 210 is positioned at the top end portion 222 of the membrane sack 208.

In some embodiments, the first pressure sensor 210 comprises one or more pressure sensing elements that generate pressure measurement signals, and these pressure measurement signals indicate the hydrostatic pressure within the membrane sack 208. As described above, the first perforated tube 202 is inserted into a suction canister that stores suction canister. In some embodiments, the suction fluids flow through the perforations on the first perforated tube 202 and arrive at the outer surface of the membrane sack 208. As more and more suction fluids fill in the suction canister, more and more pressure is exerted on the outer surface of the membrane sack 208 by the suction fluids. Because the membrane sack 208 comprises flexible material and stores buffer solution, the pressure exerted on the outer surface of the membrane sack 208 causes the membrane sack 208 to flex, which transfers the pressure from the outer surface of the membrane sack 208 to within the membrane sack 208. Because the membrane sack 208 stores buffer solution, the pressure from the suction fluids causes the buffer solution to be squeezed to the top end portion 222 of the membrane sack 208, causing changes in the hydrostatic pressure of the buffer solution. In some embodiments, the first pressure sensor 210 detects the hydrostatic pressure within the membrane sack 208. As such, the hydrostatic pressure within the membrane sack 208 corresponds to the volume of the suction fluids in the suction canister, and pressure measurement signals generated by the first pressure sensor 210 can be used to derive the volume of total suction fluids.

In some embodiments, the first pressure sensor 210 may comprise or be in the form of one or more of strain gauge (such as, but not limited to, resistive pressure transducer), variable capacitance pressure sensor (such as, but not limited to, capacitive pressure transducers), solid-state pressure sensors, micromachined silicon strain gauge sensors, piezoelectric sensors, microelectromechanical system (MEMS) pressure sensor, hydrostatic level sensor, and/or the like. Additionally, or alternatively, the first pressure sensor 210 may comprise one or more other pressure sensing elements.

In some embodiments, a non-blood fluid volume measuring device 206 comprises a second perforated tube 212 and a second pressure sensor 214.

In some embodiments, the second perforated tube 212 is positioned in the first perforated tube 202. In some embodiments, the second perforated tube 212 is associated with an outer diameter that is smaller than the inner diameter of the first perforated tube 202.

In various embodiments of the present disclosure, the second perforated tube 212 is associated with an outer diameter that is between 3 millimeters and 5 millimeters. Additionally, or alternatively, the second perforated tube 212 is associated with an inner diameter between 2.5 millimeters and 4.5 millimeters. Additionally, or alternatively, the values of the inner diameter and/or the outer diameter of the second perforated tube 212 is outside of the example ranges above.

In some embodiments, the second perforated tube 212 comprises a bottom end portion 226 and a top end portion 228. In the example shown in FIG. 2, the bottom end portion 226 of the second perforated tube 212 is opposite to the top end portion 228 of the second perforated tube 212.

In some embodiments, the second perforated tube 212 is covered by a filter paper 224. In some embodiments, the second perforated tube 212 is completely wrapped by the filter paper 224. For example, a portion of the filter paper 224 that covers the bottom end portion 226 of the second perforated tube 212 is in contact with the bottom end portion 216 of the first perforated tube 202. In some embodiments, the length of the second perforated tube 212 matches the depth of the suction canister.

In some embodiments, the filter paper 224 comprises a porous surface that defines a plurality of pores. In some embodiments, the pore size associated with the porous surface (e.g. the size of the pore in the filter paper 224) is 0.1 to 0.5 micrometers.

In some embodiments, the pore size associated with the porous surface of the filter paper 224 provides technical advantages and benefits. As described above, the second perforated tube 212 is positioned in the first perforated tube 202, which in turn is positioned in a suction canister and in contact with suction fluid that includes blood and non-fluid fluids (such as, but not limited to, irrigation fluid, urine, etc.). Most red blood cells have sizes between 7 micrometers to 13 micrometers. As such, when the suction fluid flows through the perforations of the first perforated tube 202 and arrives at the filter paper 224, the filter paper 224 filters out red blood cells and allows only non-blood fluids to flow through and arrive at the second perforated tube 212.

In some embodiments, similar to the first perforated tube 202, the second perforated tube 212 comprises rigid materials such as, but not limited to, polyethylene terephthalate (PET), polyvinyl chloride (PVC), acrylonitrile butadiene styrene (ABS), and/or the like. In the example shown in FIG. 2, the second perforated tube 212 defines one or more perforations on the tube body. As described above, the filter paper 224 filters out blood fluids and allows only non-blood fluids to pass through. In some embodiments, the non-blood fluids flow through the perforations on the second perforated tube 212 and arrive within the second perforated tube 212.

In some embodiments, the second pressure sensor 214 comprises one or more pressure sensing elements that generate pressure measurement signals, and these pressure measurement signals indicate the hydrostatic pressure within the second perforated tube 212 that is warped by the filter paper 224.

In some embodiments, the second pressure sensor 214 is positioned in the second perforated tube 212. In the example shown in FIG. 2, the second pressure sensor 214 is positioned within the second perforated tube 212 and at the bottom end portion 226 of the second perforated tube 212.

As described above, the filter paper 224 filters out blood fluids, and fluids within the second perforated tube 212 comprises non-blood fluids from the suction fluids in the suction canister (i.e. without any blood fluid). As more and more suction fluids fill in the suction canister, more and more non-blood fluids flow through the pores of the filter paper 224 and the perforations of the second perforated tube 212, and arrive within the second perforated tube 212. As such, the hydrostatic pressure exerted by the fluids within the second perforated tube 212 corresponds to the volume of non-blood fluids in the suction canister, and pressure measurement signals generated by the second pressure sensor 214 can be used to derive the volume of non-blood fluids.

In some embodiments, the second pressure sensor 214 may comprise or be in the form of one or more of strain gauge (such as, but not limited to, resistive pressure transducer), variable capacitance pressure sensor (such as, but not limited to, capacitive pressure transducers), solid-state pressure sensors, micromachined silicon strain gauge sensors, piezoelectric sensors, microelectromechanical system (MEMS) pressure sensor, hydrostatic level sensor, and/or the like. Additionally, or alternatively, the second pressure sensor 214 may comprise one or more other pressure sensing elements.

In some embodiments, the example fluid volume measuring assembly 200 comprises a connector plug 234 that receives pressure measurement signals from the first pressure sensor 210 and the second pressure sensor 214. In some embodiments, the first pressure sensor 210 and the second pressure sensor 214 are connected to the connector plug 234 through at least a plurality of electrical wires 232.

For example, each of the first pressure sensor 210 and the second pressure sensor 214 is connected to one of the plurality of electrical wires 232, which convey the pressure measurement signals. In some embodiments, the plurality of electrical wires 232 are connected to the connector plug 234. For example, the plurality of electrical wires 232 passes through the top end portion 218 of the first perforated tube 202 (which extends outside of the suction canister).

In some embodiments, the example fluid volume measuring assembly 200 comprises a carrier plate 238 that seals the top end portion 218 of the first perforated tube 202. For example, the carrier plate 238 provides an airtight seal so that no air outside the suction canister can flow into the suction canister through the top end portion 218 of the first perforated tube 202.

In some embodiments, an electrical connector 230 is secured to the top of the carrier plate 238. In some embodiments, the electrical connector 230 provides a wire tube that allows the plurality of electrical wires 232 to pass through and connect to the connector plug 234.

In some embodiments, the connector plug 234 is attached to and positioned on top of the electrical connector 230. In some embodiments, the attachment between the connector plug 234 and the electrical connector 230 is not permanent. For example, the connector plug 234 can be plugged into the electrical connector 230, and can be unplugged from the electrical connector 230.

In some embodiments, the connector plug 234 is connected to an electronic device 240 through a connector cable 242. As such, the electronic device 240 is connected to the first pressure sensor 210 and the second pressure sensor 214 through the plurality of electrical wires 232, the connector plug 234, and the connector cable 242, so that the electronic device 240 can receive pressure measurement signals from the first pressure sensor 210 and the second pressure sensor 214.

In some embodiments, the electronic device 240 comprises a processor (also referred to as a "controller"), a memory storing a program code, a display, and an alarm circuitry. In some embodiments, the electronic device 240 processes pressure measurement signals from both the first pressure sensor 210 and the second pressure sensor 214.

For example, the processor of the electronic device 240 calculates or estimates the whole suction fluid volume V1 based on the pressure measurement signals from the first pressure sensor 210, and calculates or estimates the non-blood fluid volume V2 based on the pressure measurement signals from the second pressure sensor 214. In some embodiments, the whole suction fluid volume V1 and the non-blood fluid volume V2 can be calculated or estimated based on the height (or the estimated height) of the corresponding fluid, which can be calculated based on the following equation:

$$P = \beta gh$$

In the above equation, P represents the fluid pressure, $\beta$ represents the fluid density, g represents the acceleration due to gravity, and h represents the fluid height.

In some embodiments, the estimated volume of blood loss can be calculated as the difference between V1 and V2 (i.e., V1−V2). In some embodiments, the estimated volume can be converted into a suitable unit (such as mg/dL) to indicate the volume of total blood loss.

For example, the display of the electronic device 240 provides a user interface that displays estimated blood loss in numerical form. Additionally, or alternatively, the display of the electronic device 240 provides bar indicators that indicates the current fluid volume level in the suction canister as shown in FIG. 2. As such, the display of the electronic device 240 provides an intuitive way for users (such as, but not limited to, OR/OT staff/nurses) to obtain information regarding the volume of blood loss.

In some embodiments, the alarm circuitry of the electronic device 240 provides audio and/or visual alarm(s) in addition to or in alternative of the display of the electronic device 240 displaying blood loss volume information.

For example, the electronic device 240 may provide a user interface that allows a user to choose a threshold for estimated blood loss ("EBL") and/or fast loss warning ("FLW") as per information such as, but not limited to, patient's weight, sex, adult/infant, hemoglobin count and/or other information as decided by, for example, responsible doctors. If the estimated blood loss volume exceeds the threshold for EBL, and/or the rate of blood loss exceeds the threshold for FLW, a visual/audio alarm (along with the visual indication from the display of the electronic device 240) can alert nursing, physicians, staff, and/or the like to take appropriate action(s).

For example, the alarm circuitry of the electronic device 240 comprises a buzzer that outputs an audio warning with appropriate musical note to provide a "fast loss warning" alarm to people such as the OR/OT staff. In some embodiments, the fast loss warning alarm indicates that an abnormal suction fluid is being collected with high volume blood loss in a shorter time than normal suction rate that prevailed at that moment. Additionally, or alternatively, the alarm circuitry of the electronic device 240 comprises an LED that emits red light to provide the fast loss warning alarm.

While the description above provides example operations of the alarm circuitry of the electronic device, it is noted that the scope of the present disclosure is not limited to the description above. In some examples, an example alarm circuitry of the electronic device may operate to indicate other information. For example, the alarm circuitry of the electronic device 240 may comprise a LED that is in the blinking mode to provide a visual indication that the fluid volume measuring assembly is working fine during the surgery or surgical operation.

As described above, the first perforated tube 202 (along with the total fluid volume measuring device 204 and the non-blood fluid volume measuring device 206) are disposable after each use. In contrast, the electronic device 240 is a reusable electronic unit. For example, the connector plug 234 can be attached to and detached from different electrical connectors that are secured to different first perforated tubes. As another example, the electrical connector 230 can be attached to and detached from different first perforated tubes and/or different carrier plates.

As such, the example shown in FIG. 2 illustrates an example fluid volume measuring assembly that comprises two measurement sections/devices (i.e., the total fluid volume measuring device and the non-blood fluid volume measuring device). In some embodiments, both measurement sections/devices are put together in one perforated tube (i.e., the first perforated tube). In some embodiments, the first perforated tube has a proper termination at the bottom end (i.e. the bottom end portion) that goes into a suction canister. In some embodiments, the first perforated tube has a top end (i.e. the top end portion) that extends out of the cap of the suction canister, and is adequately terminated with an electrical connector having electrical wires that connect a first pressure sensor and a second pressure sensor to the electrical connector. In some embodiments, the electrical connector is connected to an electronic device through a connector plug and a connector cable (for example, when the fluid volume measuring assembly is in use during surgeries and/or surgical operations). In some embodiments, the electronic device comprises a processor that processes temporal pressure information in relation to whole suction fluid volumes and non-blood volumes to calculate estimated blood loss volumes and fast blood loss warnings. In some embodiments, the electronic device comprises a user input interface that allows a user to configure the thresholds for EBL and the thresholds for FLW. In some embodiments, the electronic device comprises an alarm circuitry that provides an audio and/or visual alert to the users when the detected EBL or FLW exceed their respective thresholds.

Referring now to FIG. 3A and FIG. 3B example views associated with an example total fluid volume measuring device of an example fluid volume measuring assembly 300 in accordance with some embodiments of the present disclosure are provided. In particular, FIG. 3B illustrates a portion 301 of the example fluid volume measuring assembly 300 shown in FIG. 3A.

In the example shown in FIG. 3A, the example fluid volume measuring assembly 300 comprises an example first perforated tube 303, similar to the example first perforated tube 202 described above in connection with FIG. 2. For example, the example first perforated tube 303 comprises materials such as plastic (including, but not limited to, PET, PVC, ABS and/or any suitable material).

In some embodiments, the example total fluid volume measuring device comprises a membrane sack 305 and a first pressure sensor 307. In some embodiments, the example total fluid volume measuring device, including the membrane sack 305 and the first pressure sensor 307, are positioned within the example first perforated tube 303.

In some embodiments, the membrane sack 305 comprises flexible material, similar to the materials of the membrane sack 208 described above in connection with FIG. 2. In some embodiments, the membrane sack 305 has a diameter and/or a length that is the same as the diameter and/or the length, respectively, of the example first perforated tube 303.

In some embodiments, the membrane sack 305 is prefilled with a buffer solution (that includes, but not limited to, deionized water and/or saline) and is placed inside the example first perforated tube 303. In some embodiments, the example first perforated tube 303 comprises rigid material(s), and therefore provides a shield for the membrane sack 305.

As illustrated in FIG. 3A, a bottom end portion 309 of the membrane sack 305 is sealed and attached to a bottom end portion of the example first perforated tube 303. A top end portion 311 of the membrane sack 305 is extended to a top end portion of the example first perforated tube 303 and is connected to the first pressure sensor 307. In some embodiments, both the bottom end portion 309 and the top end portion 311 of the membrane sack 305 are sealed airtight.

The example construction of the example total fluid volume measuring device shown in FIG. 3A (and FIG. 2) provide various technical benefits and advantages. For example, the example total fluid volume measuring device positions the first pressure sensor 307 on the top end portion 311 of the membrane sack 305 that is at least partially prefilled with a buffer solution, allowing the hydrostatic pressure from whole suction fluid (as it is being filled in suction canister) to be transmitted to the first pressure sensor 307 without causing the first pressure sensor 307 to make direct contact with the suction fluids. As such, the example total fluid volume measuring device shown in FIG. 3A (and FIG. 2) prevents clogging of the pressure port of first pressure sensor 307 from blood coagulation because it is not exposed directly to the suction fluid.

As another example, the example total fluid volume measuring device shown in FIG. 3A (and FIG. 2) can protect the first pressure sensor from vacuum pump force before the fluid starts filling in the suction canister. As described above, the suction canister may be sealed to be airtight and may be connected to a suction vacuum that draws suction fluids to the suction canister. In some embodiments, prior to the suction fluids filling in the suction canister, there can be excessive suction vacuum force (for example, 400 mmHg). In some embodiments, the suction vacuum force is beyond the measurement range of hydrostatic pressure of many pressure sensors (for example, below 36 mmHg). To solve the technical issue of excessive suction vacuum force, the example total fluid volume measuring device shown in FIG. 3A (and FIG. 2) provides a membrane sack 305 that is thin and flexible, filled with a buffer solution (including deionized water and/or saline) and positioned in the first perforated tube 303. In some embodiments, the first perforated tube 303 provides mechanical rigidity against the outward pull force due to the vacuum pump before suction fluid filling in the suction canister, and the flexible membrane sack 305 provides the flexibility that transfers the fluid hydrostatic pressure (due to the inward push force from the suction fluid) to the first pressure sensor 307 through the prefilled buffer solution in the membrane sack 305. Additional details associated with the push force and the pull force are described in connection with at least FIG. 3B.

Referring now to FIG. 3B, an example pull force 315 and an example push force 313 are illustrated.

As described above, the example pull force 315 may be a suction vacuum force that is exerted when, for example, the vacuum pump starts to draw suction fluids and prior to suction fluids filling in the suction canister. In some embodiments, the first perforated tube 303 provides rigid material that can withstand the example pull force 315. As such, the first perforated tube 303 can reduce the pull force that is exerted on the membrane sack 305, as the effective area where the pull force can be exerted on the membrane sack 305 is limited to the areas of perforations on the first perforated tube 303.

In some embodiments, the example push force 313 may be due to the fluid pressure from the suction fluids in the suction canister. In some embodiments, the example push force 313 is exerted to the membrane sack 305 through the perforations on the first perforated tube 303. Even though the first perforated tube 303 may block some of the push force 313, the total surface of the membrane sack 305 is large enough for the example push force 313. In particular, the membrane sack 305 and the first perforated tube 303 have lengths that are the same as the full depth of the suction canister (instead of only a small length close to the bottom portion of the suction canister). The lengths of the membrane sack 305 and the first perforated tube 303 provide the technical benefits and advantages of allowing the whole suction fluid pressure to be transmitted to the first pressure sensor 307, despite that the first perforated tube 303 may block some suction fluids from being in contact with the membrane sack 305 and that blood in the suction fluids may be coagulated around some parts of the first perforated tube 303.

As such, FIG. 3A and FIG. 3B illustrate an example total fluid measurement section/device of the example fluid volume measuring assembly 300 that has a flexible membrane sack 305 in the first perforated tube 303. In some embodiments, the lengths of the first perforated tube 303 and the flexible membrane sack 305 equal the depth of the suction canister, and the outer diameters of the first perforated tube 303 and the flexible membrane sack 305 are less than the diameter of the spout opening of a suction canister. In some embodiments, the flexible membrane sack 305 is filled with a buffer solution that comprises deionized water and/or saline. In some embodiments, the first pressure sensor 307 interfaces with the buffer solution in a water-tight arrangement, providing technical advantages and benefits such as, but not limited to, (a) transmitting the hydrostatic pressure from whole suction fluid as it is being filled in canister to the first pressure sensor 307 without causing the first pressure sensor 307 to be in direct contact with the suction fluid, (b) protecting the first pressure sensor 307 (for example, with a pressure sensing range under 36 mmHg) from excessive suction vacuum force (e.g. 400 mmHg) before the suction fluids start filling the suction canister, and (c) avoiding any clogging of pressure port of the first pressure sensor 307 from blood coagulation by not exposing directly to the suction fluid.

Referring now to FIG. 4A and FIG. 4B, example views associated with an example non-blood fluid volume measuring device of an example fluid volume measuring assembly 400 in accordance with some embodiments of the present disclosure are provided. In particular, FIG. 4B illustrates a portion 402 of the example fluid volume measuring assembly 400 shown in FIG. 4A.

In the example shown in FIG. 4A, the example fluid volume measuring assembly 400 comprises an example first perforated tube 404, similar to the example first perforated tube 202 described above in connection with FIG. 2. For example, the example first perforated tube 404 comprises materials such as plastic (including, but not limited to, PET, PVC, ABS and/or any suitable material).

In some embodiments, the example non-blood fluid volume measuring device comprises a second perforated tube 406 that is separate from the first perforated tube 404. In some embodiments, a filter paper 408 is wrapped around the entire length of the second perforated tube 406, such that only non-blood fluids in the suction fluids can seep through the filter paper 408 into second perforated tube 406. In some embodiments, the outer diameter of the second perforated tube 406 is smaller than the inner diameter of the first perforated tube 404, such that the second perforated tube 406 can be inserted into and arranged within the first perforated tube 404.

Referring now to FIG. 4B, the portion 402 of the example fluid volume measuring assembly 400 illustrates a bottom end portion of the second perforated tube 406 shown in FIG. 4A.

As described above, the second perforated tube 406 is different from the first perforated tube 404. In some embodiments, the outer diameter of the second perforated tube 406 is between 3 millimeters to 5 millimeters. In some embodiments, the inner diameter of the second perforated tube 406 is between 2.5 millimeters to 4.5 millimeters.

In some embodiments, the second perforated tube 406 is wrapped with filter paper 408 that expends through the length of the second perforated tube 406, which matches the depth of the suction canister. In some embodiments, the filter paper 408 comprises pores that are smaller than micrometers, such that it can block red blood cells containing hemoglobin bigger than filter pore size. In some embodiments, the suction fluid 412 that flows through the filter paper 408 and the second perforated tube 406 comprises non-blood fluids and does not comprise blood.

In some embodiments, the second pressure sensor 410 is placed at the bottom end portion of the second perforated tube 406, where the filter paper 408 terminates and seals the second perforated tube 406. As such, the second pressure sensor 410 measures the hydrostatic pressure of suction fluid 412 (that does not comprise blood) from its level within the second perforated tube 406.

In some embodiments, one or more electrical wires 403 are connected to the second pressure sensor 410 and extend through the inner diameter of the second perforated tube 406 to the top end portion of the second perforated tube 406.

As such, FIG. 4A and FIG. 4B illustrate an example non-blood fluid measurement section/device of the example fluid volume measuring assembly 400 that measures the volume of non-blood fluids in the suction fluids. In some embodiments, the example non-blood fluid measurement section/device filters out all blood, specifically red blood cells that contain hemoglobin, from whole suction fluid. For example, the red blood cells are from 7 micrometers to 13 micrometers in size, and the example non-blood fluid measurement section/device uses a filter paper with pores between 0.1 micrometers to 0.5 micrometers in size. As such, blood cells are filtered out and stay on the surface of the filter paper, and only non-blood fluid (such as irrigation fluid, urine, other fluids) can flow through the filter paper.

In some embodiments, a second perforated tube is positioned within the filter paper and receives non-blood fluids from the suction fluid. In some embodiments, a second pressure sensor is placed at the bottom of second perforated tube (that is wrapped with filter paper), and measures the hydrostatic pressure of only non-blood fluids from suction fluid inside second perforated tube, which can be used to derive the volume of non-blood fluids that seep through filter paper while suction canister is being filled with suction fluid. For example, the second pressure sensor may provide pressure measurement signals to an electronic device as input for volume calculation, details of which are described in connection with at least FIG. 5 and FIG. 6. In such an example, the second pressure sensor is connected to one or more electrical wires that extend through the inner diameter of the second perforated tube and through the top end portion of the second perforated tube.

Figure 5:
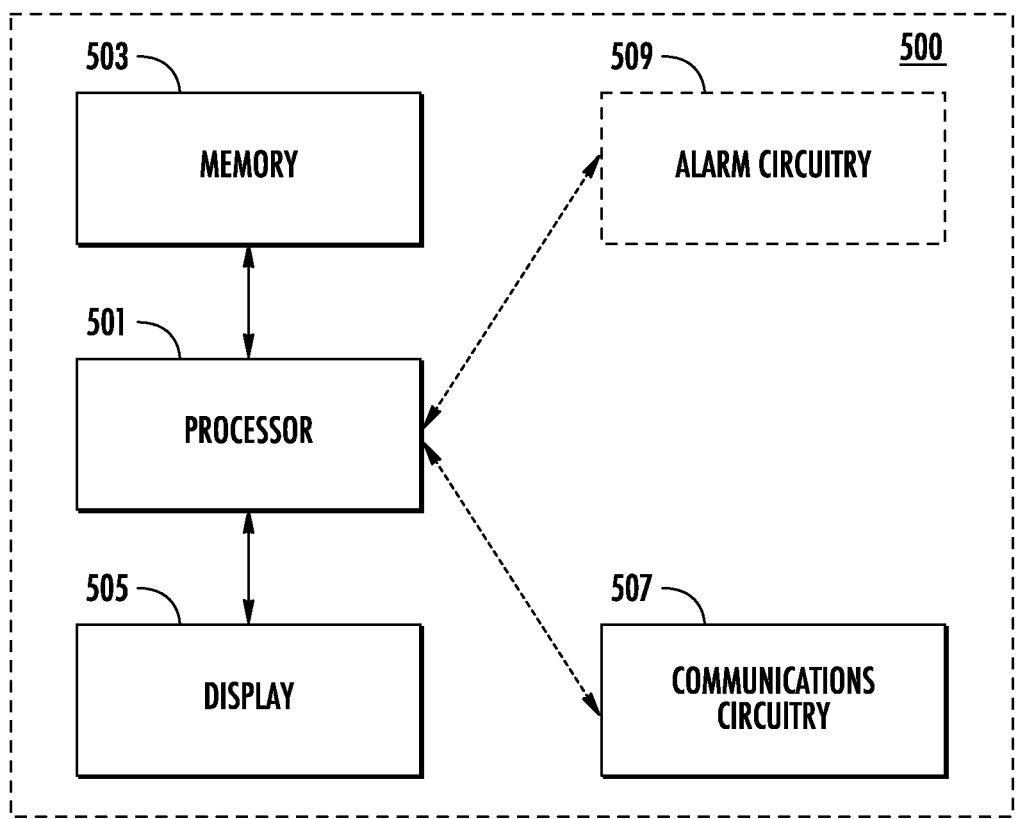
FIG. 5 illustrates an example block diagram of an example electronic device in accordance with some embodiments of the present disclosure.

Referring now to FIG. 5, an example block diagram of an example electronic device in accordance with some embodiments of the present disclosure is illustrated. In particular, FIG. 5 provides an illustrative schematic representative of an example electronic device 500 that can be used in conjunction with embodiments of the present disclosure.

The electronic device 113 of FIG. 1 and/or the electronic device 240 of FIG. 2 may be embodied by one or more computing systems, such as the electronic device 500 shown in FIG. 5. The electronic device 500 may include a processor 501, a memory 503, a communications circuitry 507, and an alarm circuitry 509. The electronic device 500 may be configured to execute the operations described above with respect to FIG. 1 to FIG. 4B and below with respect to FIG. 6. Although these components 501, 503, 505, 507, and 509 are described with respect to functional limitations, it should be understood that the particular implementations necessarily include the use of particular hardware. It should also be understood that certain of these components 501, 503, 505, 507, and 509 may include similar or common hardware. For example, two sets of circuitries may both leverage use of the same processor, network interface, storage medium, or the like to perform their associated functions, such that duplicate hardware is not required for each set of circuitries.

In some embodiments, the processor 501 (and/or co-processor or any other processing circuitry assisting or otherwise associated with the processor) may be in communication with the memory 503 via a bus for passing information among components of the apparatus. The memory 503 is non-transitory and may include, for example, one or more volatile and/or non-volatile memories. In other words, for example, the memory 503 may be an electronic storage device (e.g., a computer-readable storage medium). The memory 503 may be configured to store information, data, content, applications, instructions, or the like for enabling the apparatus to carry out various functions in accordance with example embodiments of the present disclosure.

The processor 501 may be embodied in a number of different ways and may, for example, include one or more processing devices configured to perform independently. For example, the processor 501 may be embodied as one or more complex programmable logic devices (CPLDs), microprocessors, multi-core processors, co-processing entities, application-specific instruction-set processors (ASIPs), and/or controllers. Further, the processor 501 may be embodied as one or more other processing devices or circuitry. The term circuitry may refer to an entirely hardware embodiment or a combination of hardware and computer program products. Thus, the processor 501 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 501 may be configured for a particular use or configured to execute instructions stored in volatile or non-volatile media or otherwise accessible to the processor 501. As such, whether configured by hardware or computer program products, or by a combination thereof, the processor 501 may be capable of performing steps or operations according to embodiments of the present disclosure when configured accordingly.

In some examples, the processor 501 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In one embodiment, the electronic device 500 may further include or be in communication with volatile media (also referred to as volatile storage, memory, memory storage, memory circuitry and/or similar terms used herein interchangeably). In one embodiment, the volatile storage or memory may also include memory 503 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the memory 503 may be used to store at least portions of the databases, database instances, database management system entities, data, applications, programs, program modules, scripts, program code, source code, object code, byte code, compiled code, interpreted code, machine code, executable instructions, and/or the like being executed by, for example, the processor 501 as shown in FIG. 5. Thus, the databases, database instances, database management system entities, data, applications, programs, program modules, scripts, program code, source code, object code, byte code, compiled code, interpreted code, machine code, executable instructions, and/or the like may be used to control certain aspects of the operation of the electronic device 500 with the assistance of the memory 503 and operating system.

In one embodiment, the electronic device 500 may further include or be in communication with non-volatile media (also referred to as non-volatile storage, memory, memory storage, memory circuitry and/or similar terms used herein interchangeably). In one embodiment, the non-volatile storage or memory may also include the memory 503, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the memory 503 may store databases, database instances, database management system entities, data, applications, programs, program modules, scripts, program code, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

In some examples, the processor 501 may be configured to execute instructions stored in the memory 503 or otherwise accessible to the processor 501. In some examples, the processor 501 may be configured to execute hard-coded functionalities. As such, whether configured by hardware or software methods, or by a combination thereof, the processor 501 may represent an entity (e.g., physically embodied in circuitry) capable of performing operations according to an embodiment of the present disclosure while configured accordingly. Alternatively, as another example, when the processor 501 is embodied as an executor of software instructions, the instructions may specifically configure the processor 501 to perform the algorithms and/or operations described herein when the instructions are executed.

In some embodiments, the electronic device 500 may include the communications circuitry 507 that may, in turn, be in communication with the processor 501 to transmit and/or to receive data and/or information.

For example, the communications circuitry 507 can include an antenna, a transmitter (e.g., radio), a receiver (e.g., radio), and the processor 501 that provides signals to and receives signals from the transmitter and receiver, respectively. The signals provided to and received from the transmitter and the receiver, respectively, may include signaling information/data in accordance with an air interface standard of applicable wireless systems to communicate with various entities, such as the electronic device 500, another electronic device, a client device, and/or the like.

The communications circuitry 507 may be any means such as a device or circuitry embodied in either hardware or a combination of hardware and software that is configured to receive and/or transmit data from/to a network and/or any other device, circuitry, or module in communication with the electronic device 500. The communications circuitry 507 may include one or more network interface cards, antennae, buses, switches, routers, modems, and supporting hardware and/or software, or any other device suitable for enabling communications via a network. For example, the communications circuitry 507 may be capable of operating with one or more air interface standards, communication protocols, modulation types, and access types. More particularly, the communications circuitry 507 may comprise a network interface, and may operate in accordance with any of a number of wireless communication standards and protocols. In a particular embodiment, the communications circuitry 507 may operate in accordance with multiple wireless communication standards and protocols, such as GPRS, UMTS, CDMA1900, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the communications circuitry 507 can communicate with various other entities using Unstructured Supplementary Service data (USSD), Short Message Service (SMS), Multimedia Messaging Service (MMS), Dual-Tone Multi-Frequency (DTMF) Signaling, Subscriber Identity Module Dialer (SIM dialer), and/or the like. The communications circuitry 507 can also download changes, add-ons, and updates, for instance, to its firmware, software (e.g., including executable instructions, applications, program modules), and operating system.

In some embodiments, the display 505 may be in the form of a liquid crystal display (LCD), a Light-emitting diode (LED) display, a LED backlit LCD, a thin-film transistor (TFT) LCD, a Quantum dot (QLED) display, an organic light-emitting diode (OLED) display, an active-matrix organic light-emitting diode (AMOLED) display, a Super AMOLED display, and/or the like. In some embodiments, the display 505 is electronic communication with the processor 501 and receives data and/or information from the processor 501. For example, the display 505 may render a user interface (such as, but not limited to, a graphical user interface, a command line interface, a menu-driven user interface, a touch user interface, a web user interface, a mobile application user interface, or the like). In some embodiments, the display 505 may display data and/or information received from the processor 501, details of which are described herein.

In some embodiments, the electronic device 500 may include user input/output circuitries comprising a keyboard, a mouse, a joystick, a touch screen, touch areas, soft keys, a microphone, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 503, and/or the like).

In some embodiments, the electronic device includes an alarm circuitry 509. In some embodiments, the alarm circuitry 509 provides one or more visual alarms and/or one or more audio alarms. For example, the alarm circuitry 509 may comprise a LED light with one or more light modes (e.g. steady light mode, flashing mode, etc.) and/or light colors (e.g. green, blue, red, etc.). Additionally, or alternatively, the alarm circuitry 509 may comprise a speaker and/or a buzzer that outputs sounds, voices, and/or the like. In some embodiments, the alarm circuitry 509 receives data and/or information from the processor 501. For example, the processor 501 may transmit data and/or information to the alarm circuitry 509 to trigger an audio alarm and/or a visual alarm, details of which are described herein.

It is also noted that all or some of the information discussed herein can be based on data that is received, generated and/or maintained by one or more components of the electronic device 500. In some embodiments, one or more external systems (such as a remote cloud computing and/or data storage system) may also be leveraged to provide at least some of the functionality discussed herein.

In some embodiments, other elements of the electronic device 500 may provide or supplement the functionality of particular circuitry. For example, the processor 501 may provide processing functionality, the memory 503 may provide storage functionality, the communications circuitry 507 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above, there are technical challenges, deficiencies and problems associated with measuring fluid volumes, and various example embodiments of the present disclosure overcome such challenges. For example, referring now to FIG. 6, an example method 600 of calculating fluid volumes in accordance with embodiments of the present disclosure is illustrated.

Figure 6:
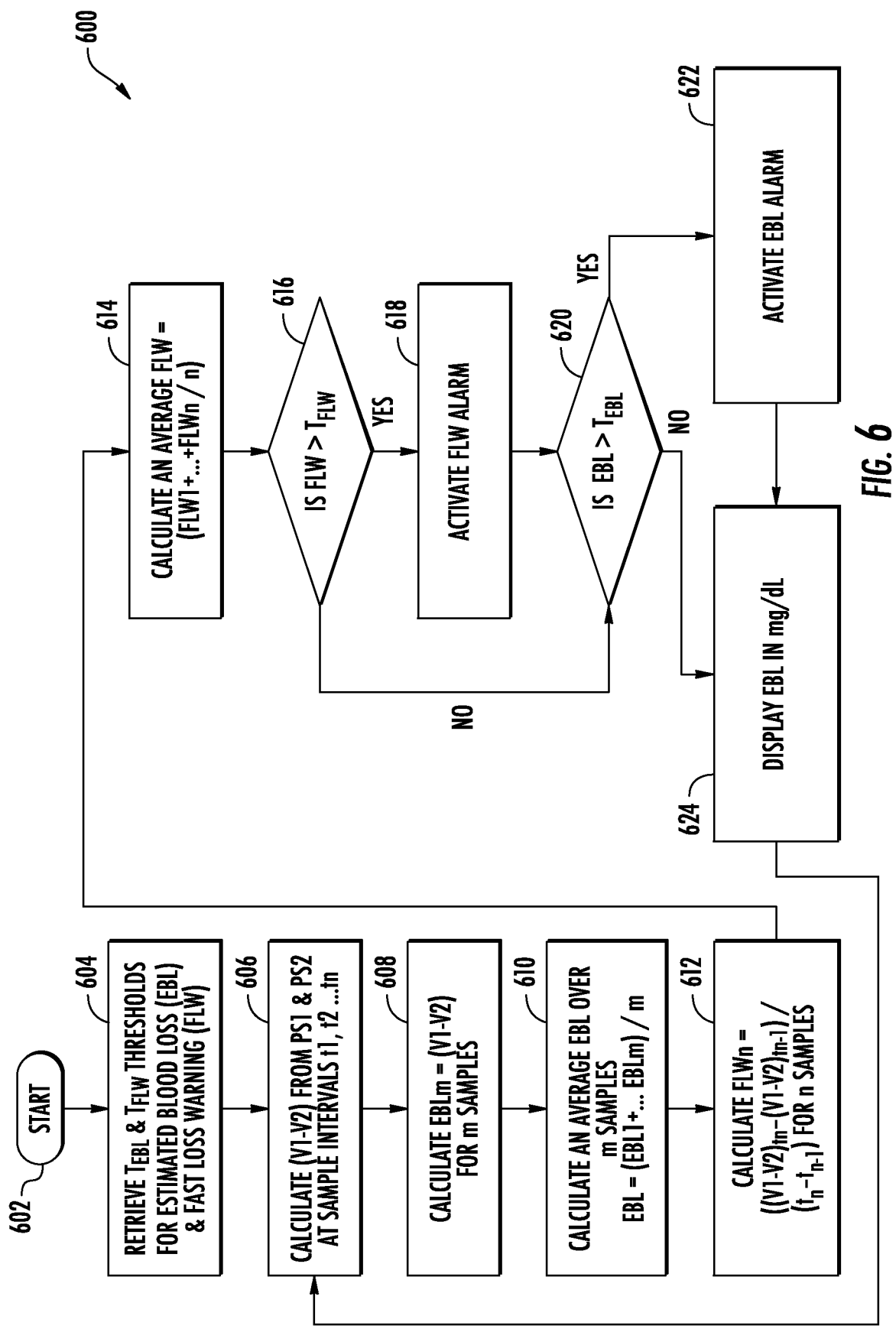
FIG. 6 illustrates an example method in accordance with some embodiments of the present disclosure.

In the example shown in FIG. 6, the example method 600 retrieves an estimated blood loss threshold value and a fast loss warning threshold value (through for example, but not limited to, at least step/operation 604), generates an average estimated blood loss variable and an average fast loss warning variable associated with a sample time period (through for example, but not limited to, at least step/operation 606, step/operation 608, step/operation 610, step/operation 612, and step/operation 614), and determines whether the average estimated blood loss variable satisfies the estimated blood loss threshold value and whether the average fast loss warning variable satisfies the fast loss warning threshold value (through for example but not limited to, at least step/operation 616 and step/operation 620).

The example method 600 starts at step/operation 602. Subsequent to and/or in response to step/operation 602, the example method 600 proceeds to step/operation 604. At step/operation 604, a processor (such as, but not limited to, the processor 501 of the electronic device 500 described above in connection with FIG. 5) retrieve $T_{EBL}$ and $T_{FLW}$ thresholds for estimated blood loss (EBL) and fast loss warning (FLW), respectively. In other words, the processor retrieves an estimated blood loss threshold value and a fast loss warning threshold value at step/operation 604.

In some embodiments, the term "estimated blood loss" (or "EBL," "estimated blood loss variable") refers to the volume of the blood loss in the suction fluid (for example, suction fluid in the suction canister). For example, the estimated blood loss may indicate the volume, the amount and/or the concentration level of blood in the suction fluid. In some embodiments, the estimated blood loss is measured by milligrams per deciliter (or mg/dL).

In the present disclosure, the term "estimated blood loss threshold value" (or "$T_{EBL}$," "$T_{EBL}$ threshold") refers to a threshold value of estimated blood loss. For example, the estimated blood loss threshold value indicates a maximum volume, a maximum amount and/or a maximum concentration level of blood in the suction fluid. In some embodiments, the estimated blood loss threshold value is measured by milligrams per deciliter (or mg/dL). If the estimated blood loss is larger than the estimated blood loss threshold value, the patient is considered to be having an excessive amount of blood loss that requires medical intervention.

In the present disclosure, the term "fast loss warning" (or "FWL," "blood loss rate") refers to a rate or pace of blood loss in the suction fluid. For example, the fast loss warning may indicate the volume/amount of blood loss in the suction fluid per a measurement time unit. As an example, the fast loss warning indicates the volume of blood loss per minute.

In the present disclosure, the term "fast loss warning threshold value" (or "$T_{FLW}$," "$T_{FLW}$ threshold") refers to a threshold value of fast loss warning. For example, the fast loss warning threshold value indicates a maximum rate or pace of blood loss in the suction fluid. If the fast loss warning is more than the fast loss warning threshold value, the patient is considered to be losing blood too fast and requires medical intervention.

In some embodiments, the estimated blood loss threshold value and/or the fast loss warning threshold value may be different for different patients due to factors such as, but not limited to, patient demographic factors (e.g. weight, age, adult or infant, male or female, the hemoglobin count, etc.). In some embodiments, the electronic device may store a plurality of estimated blood loss threshold values and/or a plurality of fast loss warning threshold values, where each of the plurality of estimated blood loss threshold values and/or the plurality of fast loss warning threshold values is associated with one or more patient demographic factors. In some embodiments, the plurality of estimated blood loss threshold values and/or the plurality of fast loss warning threshold values, as well as their associations with demographic factors, are defined by and provided to the electronic device by users such as, but not limited to, doctors.

In some embodiments, the electronic device comprises user input/output circuitries that allow a user to provide one or more inputs indicating patient demographic factors associated with the user (for example, patient weight, sex, whether patient is adult or infant, and/or the hemoglobin count of the patient) to the electronic device. In some embodiments, based on the patient demographic factors received from the user, the electronic device can retrieve the corresponding blood loss threshold value and the corresponding fast loss warning threshold value.

While the description above provides an example of retrieving the blood loss threshold value and the fast loss warning threshold value, it is noted that the scope of the present disclosure is not limited to the description above. In some examples, the blood loss threshold value and the fast loss warning threshold value may be retrieved through other methods. For example, the user input/output circuitries of the electronic device may allow a user to directly input the blood loss threshold value and the fast loss warning threshold value to the electronic device without any association with the patient demographic factors.

Referring back to FIG. 6, subsequent to and/or in response to step/operation 604, the example method 600 proceeds to step/operation 606. At step/operation 606, a processor (such as, but not limited to, the processor 501 of the electronic device 500 described above in connection with FIG. 5) calculates (V1–V2) based on pressure measurement signals from the first pressure sensor ("PS1") and the second pressure sensor ("PS2") at sample intervals that are associated with sample time points t1, t2, . . . tn.

In particular, step/operation 606, step/operation 608, and step/operation 610 illustrate example steps/operations associated with calculating an average estimated blood loss variable (or the average EBL).

At step/operation 606, the processor (a) receive a first pressure measurement signal (V1) from the first pressure sensor and a second pressure measurement signal (V2) from the second pressure sensor, and (b) calculates a pressure measurement difference (V1–V2) between the first pressure measurement signal and the second pressure measurement signal. In some embodiments, the first pressure measurement signal (V1) and the second pressure measurement signal (V2) are associated with a sample time point of the plurality of sample time points. In some embodiments, step/operation (a) and step/operation (b) above are repeated for each sample time point of the plurality of sample time points.

As described above in connection with FIG. 1 to FIG. 4B, the first pressure measurement signal (V1) from the first pressure sensor corresponds to the pressure exerted by the total fluid volume in the suction canister, and the second pressure measurement signal (V2) from the second pressure sensor corresponds to the pressure exerted by the non-blood fluid volume in the suction canister. As such, the pressure measurement difference (V1–V2) corresponds to the pressure of the blood fluid volume in the suction canister, which is proportional to the blood fluid volume in the suction canister.

In some embodiments, the electronic device sets a sample interval, and the sample time points can be determined based on the sample interval. For example, the electronic device may set the sample interval as 5 seconds. In such an example, a first sample time point t1 is at t=0 seconds. The second sample time point t2 is at t=5 seconds. The third sample time point t3 is at t=10 seconds. The electronic device may calculate a first pressure measurement difference (V1–V2) based on the first pressure measurement signal and the second pressure measurement signal associated with the first sample time point t1, a second pressure measurement difference (V1–V2) based on the first pressure measurement signal and the second pressure measurement signal associated with the second sample time point t2, and the third pressure measurement difference (V1–V2) based on the first pressure measurement signal and the second pressure measurement signal associated with the third sample time point t3.

Referring back to FIG. 6, subsequent to and/or in response to step/operation 606, the example method 600 proceeds to step/operation 608. At step/operation 608, a processor (such as, but not limited to, the processor 501 of the electronic device 500 described above in connection with FIG. 5) calculates EBLm based on (V1–V2) calculated at step/operation 606 for a total of m samples.

As described above, step/operation 606, step/operation 608, and step/operation 610 illustrate example steps/operations associated with calculating the average estimated blood loss variable (or the average EBL). At step/operation 608, the processor generates a blood loss volume estimate variable associated with the sample time point based at least in part on the first pressure measurement signal and the second pressure measurement signal.

As described above, the pressure measurement difference (V1–V2) corresponds to the pressure of the blood fluid volume in the suction canister. In some embodiments, a height of the blood in the suction canister can be calculated based on the following equation:

$$h = P/(\hat{\rho} g)$$

In the above example, h represents the fluid height (for example, the height of the blood in the suction fluids), g represents the acceleration due to gravity, $\hat{\rho}$ represents the fluid density, and P represents the fluid pressure (for example, the pressure from the blood in the suction fluids). In some embodiment, P equals (V1–V2) calculated at step/operation 606. In some embodiments, $\hat{\rho}$ is the composite density equivalent of blood, which is 0.994 gm/mL.

In some embodiments, based on the fluid height of blood of the suction fluid in the suction canister, the fluid volume of blood can be determined based on, for example, multiplying the fluid height of blood with the cross section area of the suction canister. In some embodiments, the blood loss volume estimate variable is calculated based on the fluid volume of blood. For example, the blood loss volume estimate variable may be calculated as a value of the fluid volume of blood under the unit of cubic centimeters (cc).

Additionally, or alternatively, the blood loss volume estimate variable may be calculated as a value of the fluid volume of blood under the unit of milligrams (mg) per deciliter (mg/dL). In such an example, the blood loss volume estimate variable may be calculated based on dividing the fluid volume of blood by the fluid volume of all fluids.

In some embodiments, the processor repeats the above steps/operations and generates a blood loss volume estimate variable for each of a total of m samples.

Referring back to FIG. 6, subsequent to and/or in response to step/operation 608, the example method 600 proceeds to step/operation 610. At step/operation 610, a processor (such as, but not limited to, the processor 501 of the electronic device 500 described above in connection with FIG. 5) calculates an average EBL over m samples.

As described above in connection with at least step/operation 608, the processor calculates a total number of m EBLs for a total of m samples. In some embodiments, the processor calculates the estimated blood loss (EBL) based on the following equation:

$$EBL = (EBL1 + EBL2 + \ldots EBLm)/m$$

In the above equation, EBL1 is the EBL associated with the first sample (e.g. the sample calculated based on the pressure measurement signals from the first pressure sensor and the second pressure sensor associated with the first sample time point), EBL2 is the EBL associated with the second sample (e.g. the sample calculated based on the pressure measurement signals from the first pressure sensor and the second pressure sensor associated with the second sample time point), EBLm is the EBL associated with the mth sample (e.g. the sample calculated based on the pressure measurement signals from the first pressure sensor and the second pressure sensor associated with the mt h sample time point). As such, the processor can calculate an average number of EBL over a total of m samples.

Referring back to FIG. 6, subsequent to and/or in response to step/operation 610, the example method 600 proceeds to step/operation 612. At step/operation 612, a processor (such as, but not limited to, the processor 501 of the electronic device 500 described above in connection with FIG. 5) calculates a FLW for n samples.

In some embodiments, the FLW (or the estimated blood loss variable) associated with a sample time period is generated based on the following equation:

$$FLWn=((V1-V2)_{tn}-(V1-V2)_{tn-1})/(t_n-t_{n-1})$$

In the above equation, $(V1-V2)_{tn}$ refers to the pressure measurement difference value (V1-V2) that is associated with sample time point tn. $(V1-V2)_{tn-1}$ refers to the pressure measurement difference value (V1-V2) that is associated with sample time point tn−1. As such, the FLWn represents a rate/pace of blood loss (e.g. the volume/amount of blood loss per a measurement time unit) from sample time point tn−1 to sample time point tn.

In some embodiments, the processor repeats the above calculation to determine a plurality of FLWn over a sample time period that comprises sample time point t1, t2, . . . tn. In some embodiments, n equals 10. In some embodiments, n equals a value different than 10.

Referring back to FIG. 6, subsequent to and/or in response to step/operation 612, the example method 600 proceeds to step/operation 614. At step/operation 614, a processor (such as, but not limited to, the processor 501 of the electronic device 500 described above in connection with FIG. 5) calculates an average FLW.

In some embodiments, the processor calculates the average fast loss warning variable associated with a sample time period that comprises sample time point t1, t2, . . . tn based on the following equation:

$$FLW=(FLW1+FLW2+ \ldots +FLWn/n)$$

In the above equation, FLW represents the average fast loss warning variable, and n represents the number of sample time points in the sample time period (which is the same as the number of FLW calculated for the sample time period). For example, FLW1 is the FLW associated with the first sample (e.g. the FLW at the first sample time point), FLW2 is the FLW associated with the second sample (e.g. the FLW at the second sample time point), FLWn is the FLW associated with the $n^{th}$ sample (e.g. the FLW at the nth sample time point). As such, the processor can calculate an average number of EBL over a total of m samples.

Referring back to FIG. 6, subsequent to and/or in response to step/operation 614, the example method 600 proceeds to step/operation 616. At step/operation 616, a processor (such as, but not limited to, the processor 501 of the electronic device 500 described above in connection with FIG. 5) determines whether FLW calculated at step/operation 614 is more than $T_{FLW}$ retrieved at step/operation 604. In other words, the processor determines whether the average fast loss warning variable satisfies the fast loss warning threshold value.

If, at step/operation 616, the processor determines that the average fast loss warning variable satisfies the fast loss warning threshold value (for example, the average fast loss warning variable is more than the fast loss warning threshold value), the example method 600 proceeds to step/operation 618. At step/operation 618, a processor (such as, but not limited to, the processor 501 of the electronic device 500 described above in connection with FIG. 5) activates/triggers the FLW alarm. In other words, in response to determining that the average fast loss warning variable satisfies the fast loss warning threshold value, the processor triggers a fast loss warning alarm.

In some embodiments, the fast loss warning alarm may be in the form of an audio alarm. As described above, the electronic device in accordance with some embodiments of the present disclosure may comprise a speaker or a buzzer. In some embodiments, the speaker or the buzzer outputs an audio warning in response to determining that the average fast loss warning variable satisfies the fast loss warning threshold value, providing an indication to the users that the patient is losing blood too fast.

Additionally, or alternatively, the electronic device in accordance with some embodiments of the present disclosure may comprise a LED. In some embodiments, the LED may emit red light in response to determining that the average fast loss warning variable satisfies the fast loss warning threshold value, providing an indication to the users that the patient is losing blood too fast.

Based on the audio indication and/or the visual indication, users (such as OT/OR nurses) can make quick decisions/actions to avoid blood loss and/or infusion of necessary fluid to the patient.

If, at step/operation 616, the processor determines that the average fast loss warning variable does not satisfy the fast loss warning threshold value (for example, the average fast loss warning variable is not more than the fast loss warning threshold value), the example method 600 proceeds to step/operation 620. Additionally, or alternatively, subsequent to and/or in response to step/operation 618, the example method 600 proceeds to step/operation 620. At step/operation 620, a processor (such as, but not limited to, the processor 501 of the electronic device 500 described above in connection with FIG. 5) determines whether the EBL calculated at step/operation 610 is more than the T ESL retrieved at step/operation 604. In other words, the processor determines whether the average estimated blood loss variable satisfies the estimated blood loss threshold value.

If, at step/operation 620, the processor determines that the average estimated blood loss variable satisfies the estimated blood loss threshold value (for example, the EBL is more than the $T_{EBL}$), the example method 600 proceeds to step/operation 622. At step/operation 622, a processor (such as, but not limited to, the processor 501 of the electronic device 500 described above in connection with FIG. 5) activates/triggers the EBL alarm. In other words, in response to determining that the average estimated blood loss variable satisfies the estimated blood loss threshold value, the processor triggers an estimated blood loss (EBL) alarm.

In some embodiments, the EBL alarm may be in the form of an audio alarm. As described above, the electronic device in accordance with some embodiments of the present disclosure may comprise a speaker or a buzzer. In some embodiments, the speaker or the buzzer outputs an audio warning in response to determining that the average estimated blood loss variable satisfies the estimated blood loss threshold value, providing an indication to the users that the patient is losing too much blood.

Additionally, or alternatively, the electronic device in accordance with some embodiments of the present disclosure may comprise a LED. In some embodiments, the LED may emit red light in response to determining that the average estimated blood loss variable satisfies the estimated blood loss threshold value, providing an indication to the users that the patient is losing too much blood.

As such, various embodiments of the present disclosure monitor EBLs based on the difference between the whole suction fluid volume and non-blood fluid volume in comparison with set EBL threshold to raise critical alarm to alert the OT/OR staff for quick action in deciding any fluid replacement. Based on the audio indication and/or the visual indication, users such as OT/OR nurses can make quick decisions/actions to avoid blood loss and/or perform infusion of necessary fluid to the patient.

If, at step/operation 620, the processor determines that the average estimated blood loss variable does not satisfy the estimated blood loss threshold value (for example, the EBL is not more than the $T_{EBL}$), the example method 600 proceeds to step/operation 624. Additionally, or alternatively, subsequent to and/or in response to step/operation 622, the example method 600 proceeds to step/operation 624. At step/operation 624, a processor (such as, but not limited to, the processor 501 of the electronic device 500 described above in connection with FIG. 5) displays EBL information.

For example, the processor may display the EBL information on a display on the electronic device, similar to those described and illustrated above in connection with at least FIG. 1 and FIG. 2. In some embodiments, the EBL information may be displayed in mg/dL unit, allowing users to easily ascertain the blood loss volume.

In some embodiments, subsequent to and/or in response to step/operation 624, the example method 600 returns to step/operation 606. Similar to described above, the processor calculates (V1−V2) based on pressure measurement signals from the first pressure sensor and the second pressure sensor associated with other sample intervals/sample time points.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. A fluid volume measuring assembly comprising:
    a first perforated tube;
    a total fluid volume measuring device comprising:
        a membrane sack positioned in the first perforated tube, and
        a first pressure sensor positioned at least partially in the membrane sack; and
    a non-blood fluid volume measuring device comprising:
        a second perforated tube covered by a filter paper and positioned in the first perforated tube; and
        a second pressure sensor positioned in the second perforated tube.

2. The fluid volume measuring assembly of claim 1, wherein the first perforated tube comprises a bottom end portion and a top end portion, wherein the bottom end portion is opposite to the top end portion.

3. The fluid volume measuring assembly of claim 2, wherein the bottom end portion of the first perforated tube is in contact with a bottom surface of a suction canister.

4. The fluid volume measuring assembly of claim 2, wherein the top end portion of the first perforated tube is positioned through a spout opening of a suction canister.

5. The fluid volume measuring assembly of claim 1, wherein a buffer solution is disposed in the membrane sack.

6. The fluid volume measuring assembly of claim 5, wherein the buffer solution comprises at least one of deionized water or a saline solution.

7. The fluid volume measuring assembly of claim 1, wherein the membrane sack comprises a bottom end portion and a top end portion, wherein the bottom end portion is opposite to the top end portion.

8. The fluid volume measuring assembly of claim 7, wherein the bottom end portion of the membrane sack is sealed and attached to the bottom end portion of the first perforated tube.

9. The fluid volume measuring assembly of claim 7, wherein the first pressure sensor is positioned at the top end portion of the membrane sack.

10. The fluid volume measuring assembly of claim 1, wherein the filter paper comprises a porous surface, wherein a pore size associated with the porous surface is 0.1 to 0.5 micrometers.

11. The fluid volume measuring assembly of claim 1, wherein the second perforated tube comprises a bottom end portion and a top end portion, wherein the bottom end portion is opposite to the top end portion.

12. The fluid volume measuring assembly of claim 11, wherein a portion of the filter paper that covers the bottom end portion of the second perforated tube is in contact with the bottom end portion of the first perforated tube.

13. The fluid volume measuring assembly of claim 11, wherein the second pressure sensor is positioned at the bottom end portion of the second perforated tube.

14. The fluid volume measuring assembly of claim 1, further comprising:
    an electrical connector, wherein the first pressure sensor and the second pressure sensor are connected to the electrical connector through a plurality of electrical wires.

15. The fluid volume measuring assembly of claim 14, further comprising:
    an electronic device connected to the electrical connector, wherein the electronic device comprises a processor, a memory storing a program code, a display, and an alarm circuitry.

16. The fluid volume measuring assembly of claim 15, wherein the memory and the program code are configured to, with the processor, cause the electronic device to:
    retrieve an estimated blood loss threshold value and a fast loss warning threshold value;
    generate an average estimated blood loss variable and an average fast loss warning variable associated with a sample time period; and
    determine whether the average estimated blood loss variable satisfies the estimated blood loss threshold value and whether the average fast loss warning variable satisfies the fast loss warning threshold value.

17. The fluid volume measuring assembly of claim 16, wherein, when generating the average estimated blood loss variable, the memory and the program code are configured to, with the processor, cause the electronic device to:

generate a plurality of estimated blood loss variables associated with a plurality of sample time points over the sample time period.

18. The fluid volume measuring assembly of claim 17, wherein the memory and the program code are configured to, with the processor, cause the electronic device to:

receive a first pressure measurement signal from the first pressure sensor and a second pressure measurement signal from the second pressure sensor, wherein the first pressure measurement signal and the second pressure measurement signal are associated with a sample time point of the plurality of sample time points; and generate a blood loss volume estimate variable associated with the sample time point based at least in part on the first pressure measurement signal and the second pressure measurement signal.

19. The fluid volume measuring assembly of claim 18, wherein the memory and the program code are configured to, with the processor, cause the electronic device to:

in response to determining that the average estimated blood loss variable satisfies the estimated blood loss threshold value, trigger an estimated blood loss alarm.

20. The fluid volume measuring assembly of claim 18, wherein the memory and the program code are configured to, with the processor, cause the electronic device to:

in response to determining that the average fast loss warning variable satisfies the fast loss warning threshold value, trigger a fast loss warning alarm.

* * * * *